H. I. WAINWRIGHT & M. V. AHERN.
COUPON BOOK.
APPLICATION FILED DEC. 12, 1913.
1,132,641.
Patented Mar. 23, 1915.
2 SHEETS—SHEET 2.
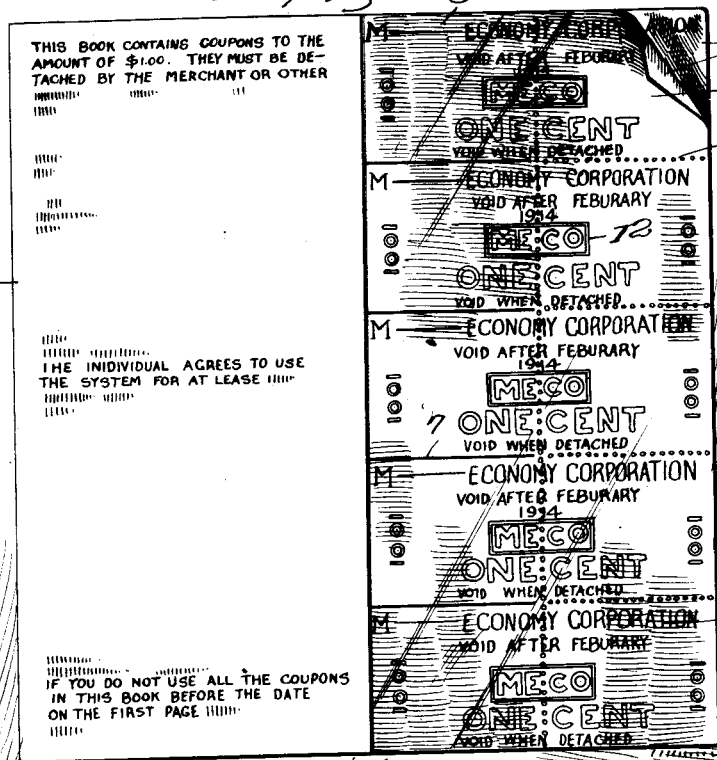
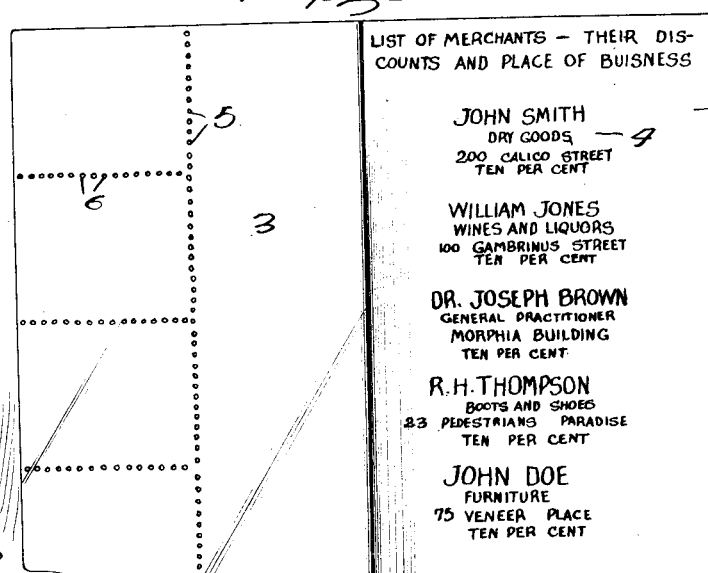
Witnesses
Inventor
H.I. Wainwright,
M.V. Ahern
By
Attorneys.

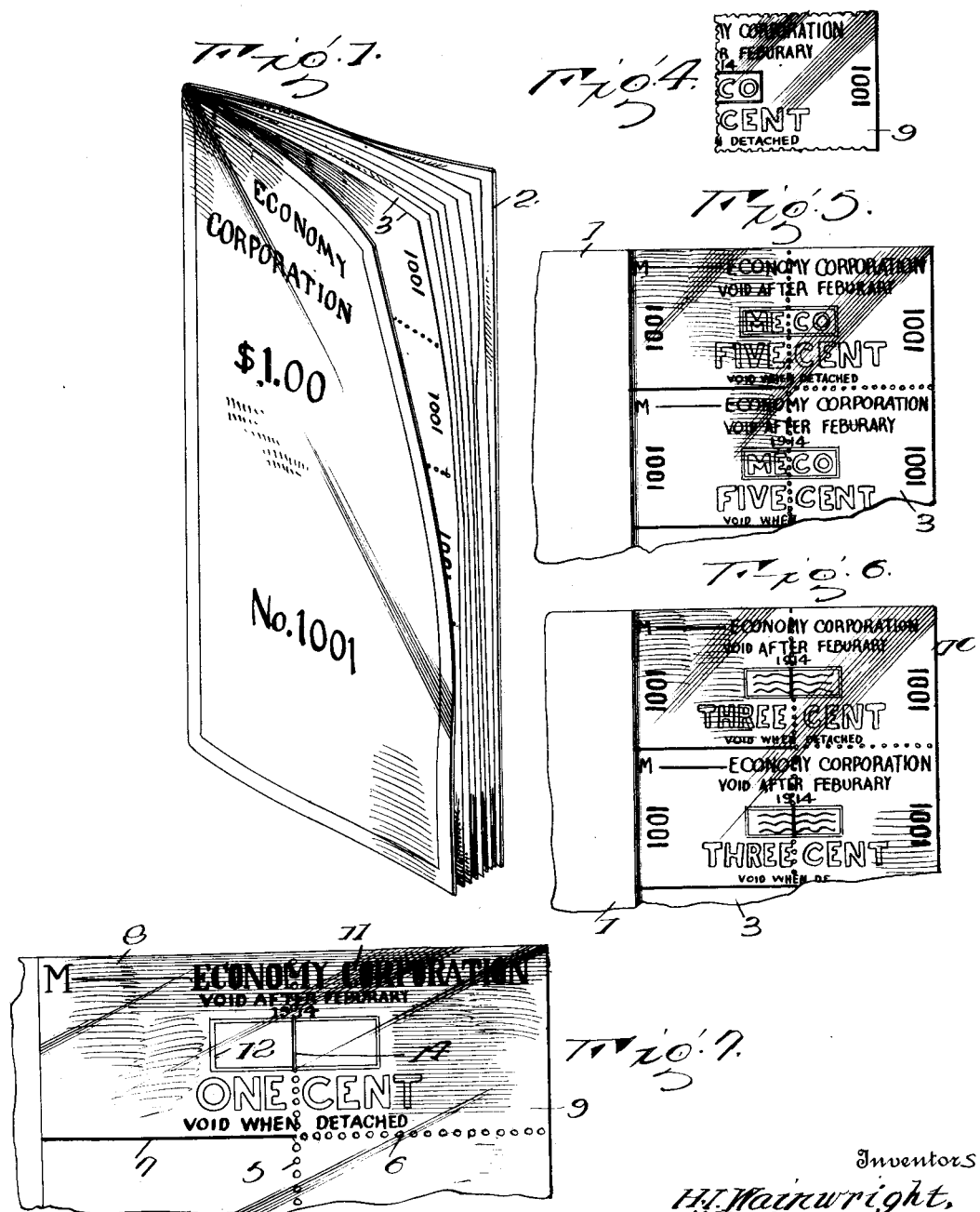

UNITED STATES PATENT OFFICE.

HENRY I. WAINWRIGHT AND MICHAEL V. AHERN, OF NORFOLK, VIRGINIA.

COUPON-BOOK.

1,132,641.   Specification of Letters Patent.   Patented Mar. 23, 1915.

Application filed December 12, 1913.  Serial No. 806,257.

*To all whom it may concern.*

Be it known that we, HENRY I. WAINWRIGHT and MICHAEL V. AHERN, citizens of the United States, residing at Norfolk, in the county of Norfolk and State of Virginia, have invented certain new and useful Improvements in Coupon-Books, of which the following is a specification.

This invention relates to coupon books, and more especially to a coupon book embodying such an arrangement of coupons as will particularly well adapt it for use in the carrying out of an economy or discount plan.

The plan, in the carrying out of which the book is intended to be used, may be briefly stated as follows: The company operating the plan will first contract with a number of business and professional men in a city or town, the merchants and professional men, in consideration of the increase in their business which will result from the carrying out of the plan, agreeing to give, for example, a discount of ten per cent. on all sales made under the plan. The company will then contract with a bank, and the company's agent being provided with proper credentials from the bank, will introduce the plan to the general public. The plan contemplates an agreement on the part of the company and upon the willingness of any individual, organization or corporation to use its system to deposit to their credit in the bank in which they have made the above mentioned contract, free to the individual, an amount equal to one half of the face value of the coupons they agree to use each month, and shall also agree to present them with the coupons for the first month's use free. The individual will, of course, agree to use the system for at least a certain definite period of time, as for example, six months, or to forfeit the initial payment presented to him by the corporation. Each and every month the coupon user will purchase from the bank the required number of coupon books and will receive an entry in his bank book for an amount equal to one half of the monthly payment for the coupons. Of course, additional terms may be agreed upon, as for example, if it is intended that the bank shall give one or more of the books free upon the return of a certain number of books from which the coupons have been used.

Specifically, it is an object of the present invention to provide a coupon book for use in an economy system, such as above briefly outlined, the arrangement of the coupons in the book and the division of the leaves into coupons, being such that a portion of each coupon may be separated from the book at the time the coupons are tendered as part payment on a purchase, the detached portion of the coupon giving no intimation as to the original value of the coupon, but the remaining or stub portion showing clearly the value of such coupons as have been detached.

The invention further contemplates so printing the coupons that the detached portion of each coupon will indicate the date after which it is void, and to arrange the printed matter, so that it will be divided in one direction by a line of perforations along which the detached portion of the coupon is to be torn off, so that should, for any reason, dispute arise as, for example, because of accidental or unintentional separation of some of the coupons by the person using the book, the detached portions of the coupons may be compared with the stub portions to determine whether or not the two portions were originally actually related.

In the accompanying drawings: Figure 1 is a perspective view of the book of coupons embodying the present invention. Fig. 2 is a plan view showing the inside cover page of the book and the page immediately following. Fig. 3 is a view similar to Fig. 2, but illustrating the last inside cover page and the obverse side of the page immediately preceding. Fig. 4 is a plan view of a portion of one of the coupons separated from the book. Fig. 5 is a plan view of a portion of one of the leaves of the book, illustrating the manner in which the coupons above the value of one cent are to have their values printed thereon so that the same cannot be determined merely from an inspection of the detached portion of the coupon. Fig. 6 illustrates another arrangement of the coupons and the means which may be employed to permit of identification of the coupon portions after separation. Fig. 7 is a view similar to Fig. 6, illustrating a further means provided for this purpose.

Corresponding and like parts are referred to in the following description and indicated in all the views of the drawings by the same reference characters.

The book of coupons is made up of a front cover page 1, a back cover page 2, and a number of leaves, indicated in general, by the numeral 3, the leaves being bound between the cover pages in any ordinary manner. Upon the inside back cover page there is printed a list of merchants and professional men operating under the system with their addresses and the discounts which they agree to give, this list being indicated in Fig. 3 of the drawings by the numeral 4. Upon the inside front cover page there is printed an explanation of the plan or system and a full statement of the conditions to be observed and performed by the contracting parties under the plan. Each of the leaves 3 is divided by printed lines and lines of perforations into a number of coupons, a portion of each of which coupons is severable. In dividing each leaf into a number of coupons, the leaf is formed with a line of perforations 5, in the present instance, extending vertically medially of the leaf, and the leaf is provided at suitable intervals with other lines of perforations, indicated at 6, which extend parallel to each other and to the upper and lower edges of the leaf and, consequently, transversely of the leaf. A line of perforations furthermore extends from the free edge of the leaf inwardly to the first mentioned line of perforations. A printed line 7 constitutes a continuation of each line of perforations 6, so that the coupons between the line of perforations 5 and the inner edge of each leaf, are integrally connected, but their portions which are bounded by the lines of perforations 5 and 6 and the other edges of the leaf may be severed or detached.

For convenience in further describing the characteristics of the coupons, the integral or stub portion of each coupon is indicated specifically by the numeral 8 and the detachable portion by the numeral 9. The portions 8 and 9 are printed with corresponding numbers, as indicated at 10, all of the coupons in a book bearing the same number. These numbers will, of course, serve as a means for indentifying the stub and several portions of the coupons, and for identifying the stub portions should the cover of the book, which also bears a number corresponding to the numbers upon the coupons become accidentally detached, when the said stub portions are presented for redemption, which it is contemplated they shall be, a coupon book being given free for the return of a certain number of book stubs, for example.

While the printed matter upon each coupon is more or less arbitrary, in nature, in the specific example shown in the drawings, each coupon is printed near its upper edge, as at 11, with the name of the corporation or company operating the plan and below this line of printing has printed thereon the words "Void after February", the name of the month, of course, varying in the different issues of the book. By reference to the drawings, it will be observed that the words "Void after" are located at one side of the vertical line of perforations 5, the name of the month being located entirely upon the detached portion 9 of the coupon. Below the legend, above described, each coupon is printed with the year, as for example, "1914", and in printing the year, the last two numerals of the year designation will be printed upon the said detachable portion 9 of the coupon and, consequently, the line of perforations 5 will divide the year designation. By so arranging the printed matter, so far described, the detachable portion of each coupon will bear data indicating the month and the year during which it may be tendered as part payment of the purchase price of an article or the payment of a bill. Below the year designation, each coupon has printed thereon a border 12 of arbitrary outline, but here shown as rectangular. Whether this border be rectangular or of some other outline, however, the line of perforations 5 divides the same vertically.

In one form of the invention any desired combination of letters or symbols is printed within the border and it will be apparent that the top and bottom lines of the border and the said letters or symbols within the same provides an additional means for determining whether a detached coupon portion has any relation to a certain coupon stub portion. Below the border 12 each coupon has printed thereon words designating the value of the coupon. In Fig. 2 of the drawings, for example, the coupons illustrated have each the value of one cent, and it will be noted that the word "One" is printed at one side of the vertical perforation 5 and the word "Cent" is printed at the other side of the said line, or more specifically, upon the portion 9 of each coupon. The coupons shown in Fig. 5 have each the value of five cents, and those shown in Fig. 6 have each the value of three cents. It will be noted in each instance, however, that regardless of the value of the coupon, the word "Cent" remains in the singular form, so that the value of the coupon in its initial form cannot be determined merely by an inspection of the portion 9 after it has been detached. Each coupon further bears a statement indicating that it is void when its portion 9 is detached.

If it is found necessary to provide means for more accurately identifying the severed coupon portions, the space inclosed within the border 12 may be initially left blank and at the time of the sale of the book of coupons, a number of straight or wavy lines 13 may be stamped within each blank space. The relation of these lines to the border lines will, of course vary in every instance. In another form of the coupon, the space inclosed by the border is left blank and the line of perforations 5 is interrupted at intervals by straight incisions 14 which vertically divide the spaces inclosed within the borders. When these spaces arê left blank, as just described, the corporation's agent may initial, letter or mark any suitable symbol within the border, the severed lines of which must, of course, match to insure the identity of the coupon portions.

Having thus described the invention, what is claimed as new is:

1. A book having its leaves each divided in one direction by a line of perforations and at intervals in another direction by lines of perforations extending from one edge of the leaf to the first mentioned line of perforations, the divisions of the leaves constituting coupons having characters printed or otherwise marked thereon and extending across the first mentioned line of perforations, each coupon having characters printed or otherwise marked thereon designating the value of the coupon, one portion of the coupon bearing an expression of the unit of valuation and the other portion bearing an expression of the number of units.

2. A book having its leaves each divided in one direction by a line of perforations and at intervals in another direction by lines of perforations extending from one edge of the leaf to the first mentioned line of perforations, the divisions of the leaves constituting coupons having characters printed or otherwise marked thereon and extending across the first mentioned line of perforations, each coupon bearing data indicative of the period during which the coupon is valid, the data being so arranged that the expression of one or more periods of time will occur upon the detachable portion of the coupon.

3. A book having its leaves each divided in one direction by a line of perforations and at intervals in another direction by lines of perforations extending from one edge of the leaf to the first mentioned line of perforations, the divisions of the leaves constituting coupons and each coupon having printed or otherwise marked thereon a border, certain of the lines of which extend across the first mentioned line of perforations, and the said first mentioned line of perforations being interrupted at intervals by incisions lying within the said border and dividing the space inclosed thereby.

In testimony whereof we affix our signatures in presence of two witnesses.

HENRY I. WAINWRIGHT. [L. S.]
MICHAEL V. AHERN. [L. S.]

Witnesses:
ETTA F. SHARP,
CHAS. MCDERMOTT, Jr.